United States Patent
Yu et al.

(10) Patent No.: US 9,560,310 B2
(45) Date of Patent: Jan. 31, 2017

(54) METHOD AND SYSTEM FOR RESCALING IMAGE FILES

(71) Applicant: Cluster Technology Limited, Hong Kong Science Park, N.T. (HK)

(72) Inventors: Haile Yu, Shatin (HK); Jackson Ho Cheun Yeung, Sai Kung (HK)

(73) Assignee: CTACCEL LIMITED, Hong Kong Science Park, N.T. (HK)

( * ) Notice: Subject to any disclaimer, the term of this patent is extended or adjusted under 35 U.S.C. 154(b) by 482 days.

(21) Appl. No.: 14/228,027

(22) Filed: Mar. 27, 2014

(65) Prior Publication Data

US 2015/0281636 A1    Oct. 1, 2015

(51) Int. Cl.
| | |
|---|---|
| *H04N 5/91* | (2006.01) |
| *H04N 9/74* | (2006.01) |
| *G06F 17/30* | (2006.01) |
| *G11B 27/00* | (2006.01) |
| *H04N 5/76* | (2006.01) |
| *H04N 9/804* | (2006.01) |

(52) U.S. Cl.
CPC ............ *H04N 5/91* (2013.01); *G06F 17/3028* (2013.01); *G11B 27/00* (2013.01); *H04N 5/76* (2013.01); *H04N 9/8047* (2013.01)

(58) Field of Classification Search
CPC .. G06F 17/3028; H04N 5/2628; G06T 3/4023
USPC ........ 348/581, 571, 561, 715, 716; 382/298, 382/299; 345/472, 660
See application file for complete search history.

(56) References Cited

U.S. PATENT DOCUMENTS

2011/0211036 A1*   9/2011   Tran ................... H04N 5/23238
                                                            348/14.08

* cited by examiner

*Primary Examiner* — Paulos M Natnael
*Assistant Examiner* — Jean W Desir
(74) *Attorney, Agent, or Firm* — Kilpatrick Townsend & Stockton LLP (57) ABSTRACT

A system for resizing image files includes an FPGA including an interface controller operable to receive a plurality of image files through an interface, a computing kernel controller, and a memory controller. The FPGA also includes an interconnect coupled to the computing kernel controller and the memory controller and a plurality of computing kernels coupled to the interconnect. The system also includes a memory coupled to the FPGA.

12 Claims, 10 Drawing Sheets

METHOD AND SYSTEM FOR RESCALING IMAGE FILES

BACKGROUND OF THE INVENTION

JPEG is the de facto image format used in the Internet. Due to the explosive growth of the use of social networking and internet communications, a large amount of images are transferred every day, most of which are compressed using the JPEG standard. Because mobile devices such as tablets and smart phones and fixed devices such as desktop computers have different screen resolutions and bandwidth capabilities, it is necessary to resize images for optimized viewing on each individual device. This resizing task is usually done in datacenters, using large number of servers based on conventional microprocessors.

Despite the progress made in data communications and processing, there is a need in the art for improved methods and systems for resizing or rescaling images.

SUMMARY OF THE INVENTION

Embodiments of the present invention relate to image processing. More particularly, embodiments of the present invention provide methods and systems for rescaling images compressed using the JPEG standard using an accelerator. In a specific embodiment, a system for rescaling JPEG images utilizes multiple kernels to rescale multiple images concurrently, accelerating the image rescaling process. The present invention is applicable to image compression formats other than JPEG and is applicable to other rescaling operations.

According to an embodiment of the present invention, a system for resizing image files is provided. The system includes an FPGA including an interface controller operable to receive a plurality of image files through an interface; a computing kernel controller; and a memory controller. The FPGA also includes an interconnect coupled to the computing kernel controller and the memory controller and a plurality of computing kernels coupled to the interconnect. The system also includes a memory coupled to the FPGA.

According to another embodiment of the present invention, a method of resizing image files is provided. The method includes providing an AXI interconnect and providing a plurality of computing kernels communicatively coupled to the AXI interconnect. The method also includes receiving a first image file characterized by a first image resolution, sending, from a first port of the AXI Interconnect to a first computing kernel, a first payload associated with the first image file, receiving a second image file characterized by a second image resolution, and sending, from a second port of the AXI Interconnect to a second computing kernel, a second payload associated with the second image file. The method further includes resizing, at the first computing kernel and the second computing kernel, the first payload and the second payload concurrently. The first payload is resized to a third image resolution differing from the first image resolution and the second payload is resized to a fourth image resolution differing from the second image resolution. Additionally, the method includes sending, from the first computing kernel to the first port of the AXI Interconnect, the resized first payload and sending, from the second computing kernel to the second port of the AXI Interconnect, the resized second payload.

According to a specific embodiment of the present invention, a non-transitory computer-readable storage medium comprising a plurality of computer-readable instructions tangibly embodied on the computer-readable storage medium is provided. The plurality of computer-readable instructions, when executed by a data processor, provide resized image files. The plurality of instructions include instructions that cause the data processor to receive a first image file characterized by a first image resolution, instructions that cause the data processor to send, from a first port of an AXI Interconnect to a first computing kernel, a first payload associated with the first image file, and instructions that cause the data processor to receiving a second image file characterized by a second image resolution. The plurality of instructions also include instructions that cause the data processor to send, from a second port of the AXI Interconnect to a second computing kernel, a second payload associated with the second image file and instructions that cause the data processor to resize, at the first computing kernel and the second computing kernel, the first payload and the second payload concurrently. The first payload is resized to a third image resolution differing from the first image resolution and the second payload is resized to a fourth image resolution differing from the second image resolution. The plurality of instructions further include instructions that cause the data processor to send, from the first computing kernel to the first port of the AXI Interconnect, the resized first payload and instructions that cause the data processor to send, from the second computing kernel to the second port of the AXI Interconnect, the resized second payload.

Numerous benefits are achieved by way of the present invention over conventional techniques. For example, embodiments of the present invention utilize an Field Programmable Gate Array (FPGA) based accelerator for rescaling of JPEG computer images that is an order of magnitude faster than conventional microprocessor based servers while utilizing only a fraction of the power. In contrast with an ASIC based accelerator, an FPGA is reconfigurable, which allows the function of the accelerator to be updated or modified after production. These and other embodiments of the invention along with many of its advantages and features are described in more detail in conjunction with the text below and attached figures.

DETAILED DESCRIPTION OF SPECIFIC EMBODIMENTS

According to an embodiment of the present invention, methods and systems related to image processing are provided. More particularly, embodiments of the present invention provide methods and systems for rescaling images compressed using the JPEG standard. In a specific embodiment, a system for rescaling JPEG images utilizes multiple kernels to rescale multiple images concurrently, accelerating the image rescaling process. The present invention is applicable to image compression formats other than JPEG and is applicable to other rescaling operations.

Figure 1:
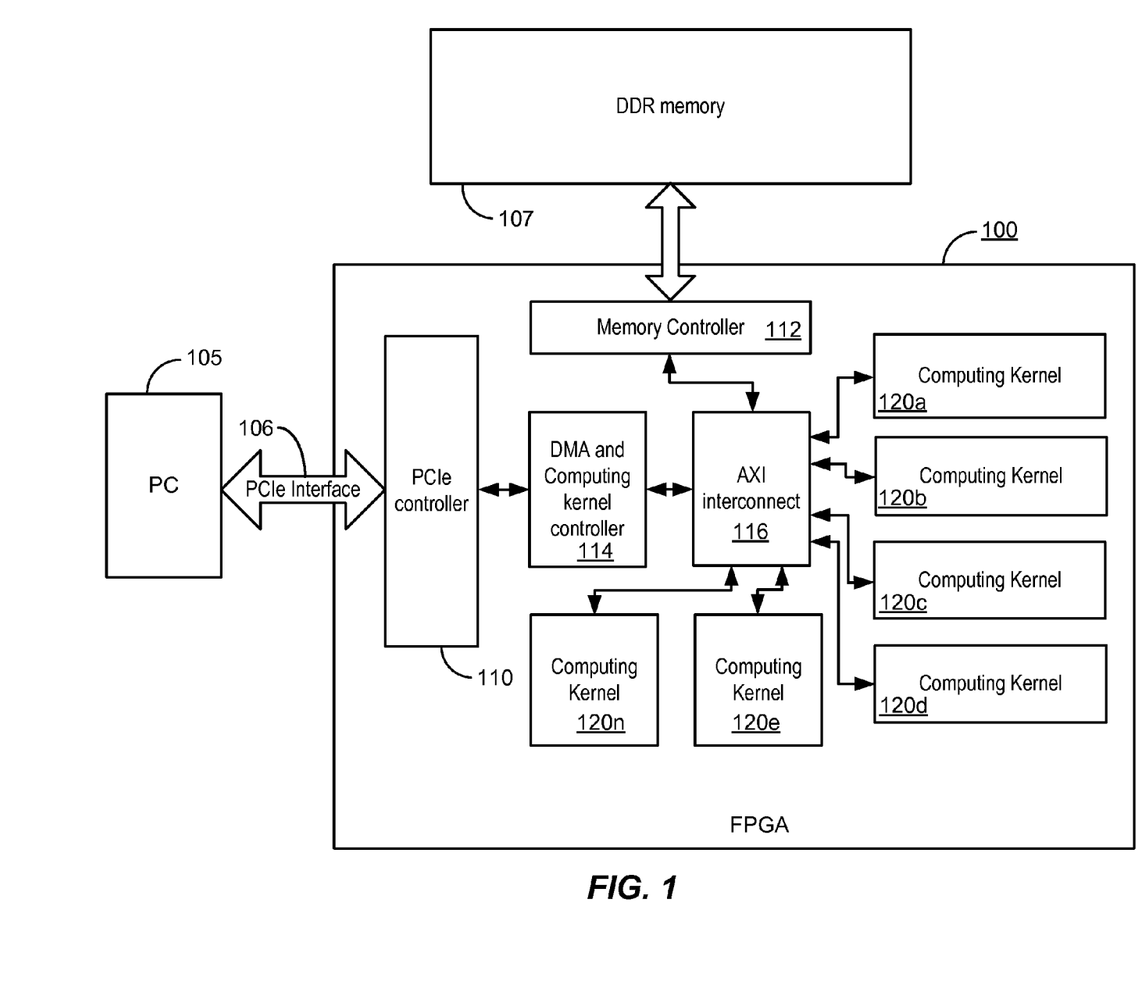
FIG. 1 is a simplified schematic diagram illustrating a system for rescaling images according to an embodiment of the present invention.

FIG. 1 is a simplified schematic diagram illustrating a system for rescaling images according to an embodiment of the present invention. For clarity, some components associated with controls are omitted from the system illustrated in FIG. 1. The controllers and the control signals are described in additional detail with respect to FIG. 9. According to an embodiment of the present invention, the accelerator described herein includes a printed circuit board (PCB) containing one or more FPGAs, on board memory, and other components. The accelerator, also referred to as an image resizing engine receives JPEG images from a computer using an interface (e.g., a PCIe interface). In one implementation, the JPEG images are transferred to the accelerator using Direct Memory Access (DMA). The memory interface, DMA engine, controller and accelerator kernel can be implemented in the FPGA as described more fully below. Each accelerator includes multiple kernels, which are operable to decode the image, resize the image, and then encode the resized image back to the JPEG format. The resized JPEG images are transferred back to the computer. In another implementation as discussed below in relation to FIG. 10, the JPEG images are transferred to the accelerator through a high speed network interface such as 1G/10G/40G Ethernet or Infiniband as network packets, with or without the use of Remote Direct Memory Access (RDMA).

As illustrated in FIG. 1, a computer 105 is connected to an image resizing engine 100 through a suitable interface 106. Example of computer is an x86 based multicore server running the Linux operating system. In the embodiment illustrated in FIG. 1, the interface 106 is a PCIe interface, but this is not required by embodiments of the present invention.

Figure 10:
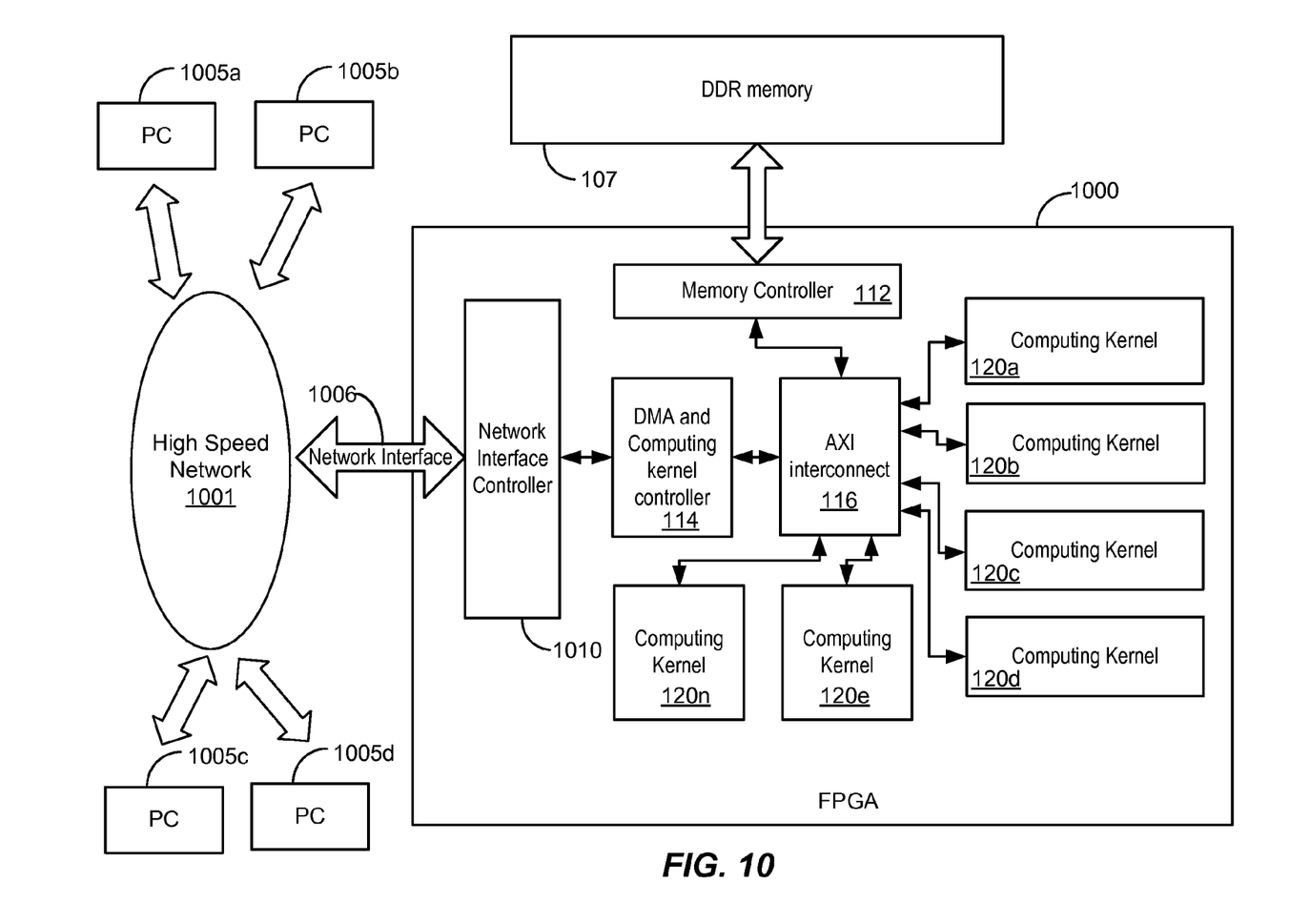
FIG. 10 is a simplified schematic diagram illustrating an alternative implementation of a system for rescaling images according to an embodiment of the present invention.

FIG. 10 is a simplified schematic diagram illustrating an alternative implementation of a system for rescaling images according to an embodiment of the present invention. The alternative implementation illustrated in FIG. 10 shares similarities to that illustrated in FIG. 1, but uses an network interface 1006 connected to the network interface controller 1010 instead of a PCIe interface 110 as shown in FIG. 1. As illustrated in FIG. 10, the network interface 1006 between the image resizing engine 1000 and the plurality of computers 1005a-1005d accessible through high speed network 1001 is a network interface such as Ethernet or Infiniband. As an example, the network interface 1006 can be a high speed network interface, including, but not limited to 1G/10G/40G Ethernet interface, in Infiniband interface, or the like. Although four computers 1005a-1005d are illustrated, the present invention is not limited to this particular number.

Embodiments of the present invention utilize an FPGA to implement one or more features of the invention, including elements of the image resizing engine 100. In some embodiments, the entire image resizing engine 100 is implemented in a single FPGA, providing functionality that would be associated with a printed circuit board in other implementations. The elements implemented in the FPGA include, in the embodiment illustrated in FIG. 1, PCIe controller 110, or alternatively, a network interface controller 1010, and memory controller 112, which interacts with DDR memory 107.

The image resizing engine 100 also includes a DMA and computing kernel controller 114, an advanced extensible interface (AXI) interconnect 116, and multiple computing kernels 120a-120n. The DMA controller controls the data flow between computing kernels 120a-120n and DDR memory 107 as discussed in relation to the AXI interconnect 116 below and between the DDR memory 107 and the computer 105. The AXI interface 116 is operable to read data from the DDR memory 107 through memory controller 112 and to provide data read from the DDR memory 107 to the computing kernels and to provide data that can be written to the DDR memory 107. Thus, the AXI interconnect 116 serves as a cross connect to route data from the DDR memory 107 to the computing kernels 120 and from the computing kernels 120 to the DDR memory 107.

Figure 3:
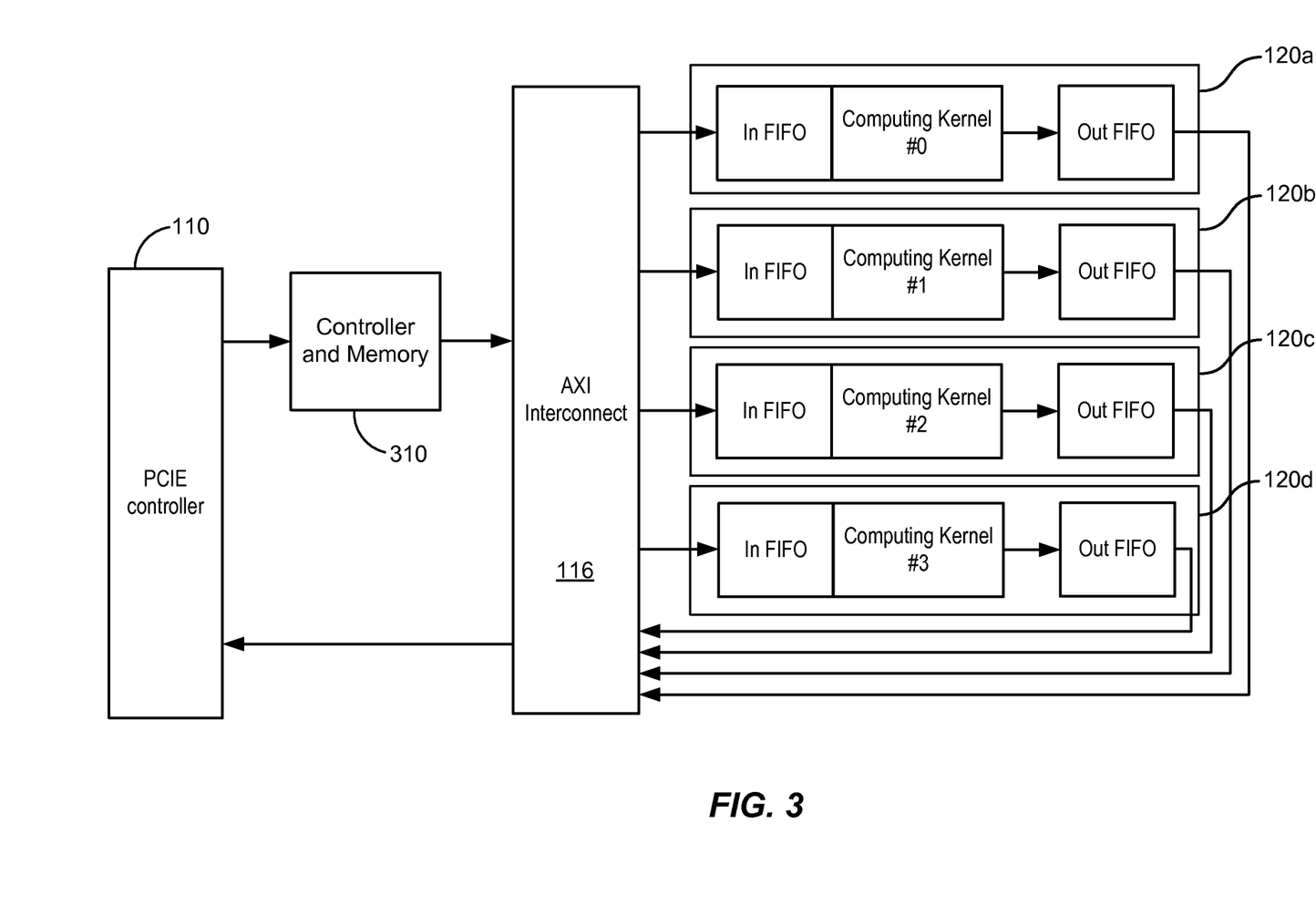
FIG. 3 is a simplified schematic diagram illustrating multiple rescaling kernels according to an embodiment of the present invention.

The computing kernels 120 are described in additional detail in reference to FIG. 3. In some implementations, the computing kernel controller 114 controls data flow between the computer 105 and the image resizing engine 100 as well as data flow between the DDR memory 107 and the computing kernels 120 (though the memory controller 112). The JPEG decoding flow includes parsing the JPEG header, decoding the Huffman and zero-length encoded data, performing zig-zag scan and IDCT. The speed of the process of performing the zig-zag scan and IDCT can be increased by processing several pixels concurrently. However, decoding of the Huffman encoded data is an inherently serial process and is the bottleneck when decoding a JPEG image using a CPU with a general purpose processor. Embodiments of the present invention utilize several approaches to enable high speed decoding of the Huffman and zero length encoded data on the accelerator.

By providing multiple computing kernels 120a through 120n, each computing kernel is operable to work on separate images concurrently, providing a parallel processing functionality according to embodiments of the present invention. Thus, in an implementation with six computing kernels as illustrated in FIG. 1, six different images can be processed concurrently, improving system performance in comparison with conventional systems. As will be evident to one of skill in the art, the number of computing kernels 120 can be greater than the six illustrated in FIG. 1. In a particular implementation, the AXI interconnect 116 (in accordance with the system resources of the FPGA), provides 16 ports, although this is not required by the present invention. Using one port (e.g., a master interface port) for connection to the memory controller 112 (and thus to the DDR memory 107), one port for connection to the DMA and computing kernel controller 114, and 14 ports that are available for computing kernels 120, resulting in a value of N=14. In other implementations, the resources of the FPGA enable the utilization of addition computing kernels.

In another implementation, multiple AXI interconnects are provided on the FPGA, enabling the image resizing engine 100 to include, as an example, two AXI interconnects, each coupled to 14 computing kernels, resulting in a total of 28 computing kernels per image resizing engine 100. Thus, although a single AXI interconnect 116 is illustrated in FIG. 1 for purposes of clarity, the present invention is not limited to this particular number and additional AXI interconnects can be utilized to increase the parallel processing power of the system.

Although the DMA and computing kernel controller 114 is illustrated as a single entity, this is not required by the present invention and the DMA controller functions and the computing kernel controller functions can be implemented separately.

Referring once again to FIGS. 1 and 10, although PCIe controller 110/network controller 1010 is illustrated as connecting to a single DMA and computing kernel controller 114, the present invention is not limited to this implementation. In other embodiments, the PCIe controller 110/network controller 1010 can connect to more than one DMA and computing kernel controller 114, for example, two, four, or another number of DMA and computing kernel controllers. Thus, additional resources can be utilized at the DMA and computing kernel controller level by adding additional DMA and computing kernel controllers connected to the PCIe controller 110/network controller 1010 or at the AXI interface level by adding additional AXI interfaces connected to multiple computing kernels. Thus, the implementation illustrated in FIGS. 1 and 10, with a single DMA and computing kernel controller/AXI interconnect pair, is not intended to limit the scope of the present invention but only to illustrate one particular implementation. One of ordinary skill in the art would recognize many variations, modifications, and alternatives.

Referring to FIG. 1, although the PCIe controller 110 is illustrated as connecting to a single DMA and computing kernel controller 114, the present invention is not limited to this implementation. In other embodiments, the PCIe controller 110 can connect to more than one computing kernel controller 114, for example, two, four, or another number of computing kernel controllers. Thus, additional resources can be utilized at the computing kernel controller level by adding additional computing kernel controllers connected to the PCIe controller 110 or at the AXI interface level by adding additional AXI interfaces connected to multiple computing kernels. Thus, the implementation illustrated in FIG. 1, with a single computing kernel controller/AXI interconnect pair, is not intended to limit the present invention but only to illustrate one particular implementation. One of ordinary skill in the art would recognize many variations, modifications, and alternatives.

Figure 2:
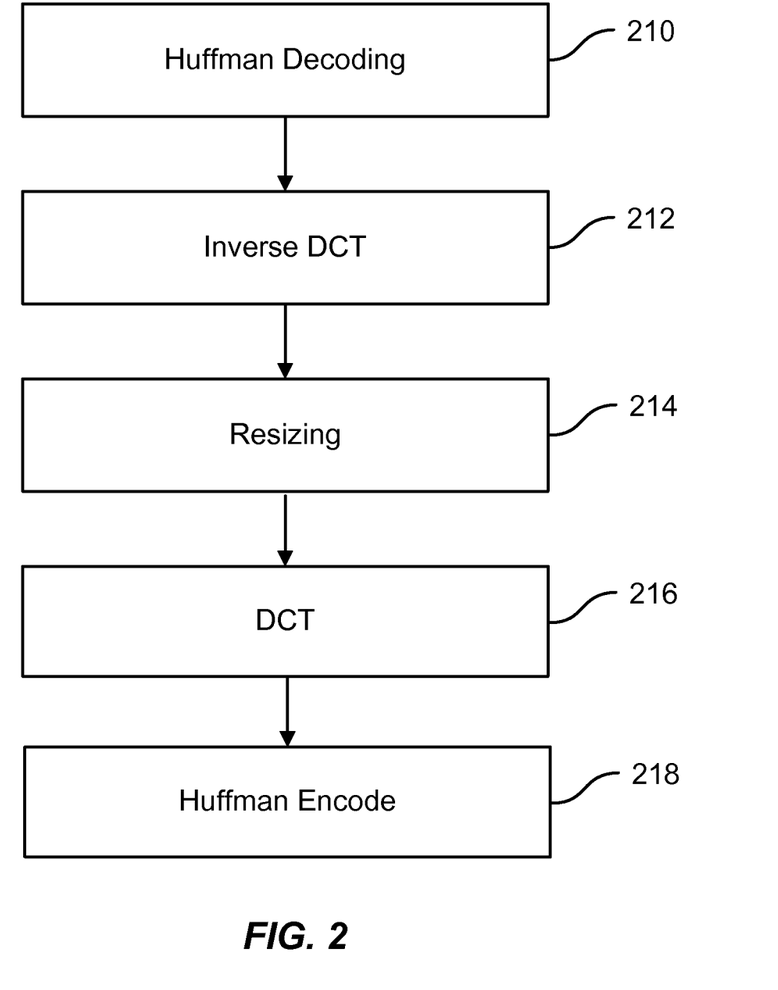
FIG. 2 is a simplified flowchart illustrating a method of rescaling a JPEG image according to an embodiment of the present invention.

FIG. 2 is a simplified flowchart illustrating a method of rescaling a JPEG image according to an embodiment of the present invention. As illustrated in FIG. 2, the method includes receiving a JPEG image having a first resolution and performing Huffman decoding (210). An inverse discrete cosine transform (DCT) is performed on the decoded image (212). The image with the first resolution is then resized in accordance with the desired size of the output image to provide an image at a second resolution (214). As an example, for display on a mobile device, a large image (e.g., 3,264×2,448 pixels) can be resized to a smaller size suitable for display on the smaller display associated with the mobile device (e.g., 1,024×768 pixels). Other resizing sizes are included within the scope of the present invention.

The method also includes, after resizing, performing the DCT operation (216) and Huffman encoding the transform image to provide the resized JPEG image at the second resolution (218). In some implementations, the images for resizing are received from the PCIe interface and the resized images are sent back to the PCIe interface. In other implementation, the images for resizing are received from a network interface and the resized images are sent back to a network interface. At an implementation level, the resized image data can be stored in the DDR memory after resizing and then retrieved by the DMA controller and sent to the PCIe interface for delivery to the computer. Alternatively, the resized image data is deliver to the computer through a network interface. In other implementations, the images for resizing are received from the DDR memory and are sent back to the DDR memory. Moreover, the system provides the functionality to receive images from the PCIe interface or network interface and send resized images to the DDR memory and vice versa. One of ordinary skill in the art would recognize many variations, modifications, and alternatives.

It should be appreciated that the specific steps illustrated in FIG. 2 provide a particular method of rescaling a JPEG image according to an embodiment of the present invention. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
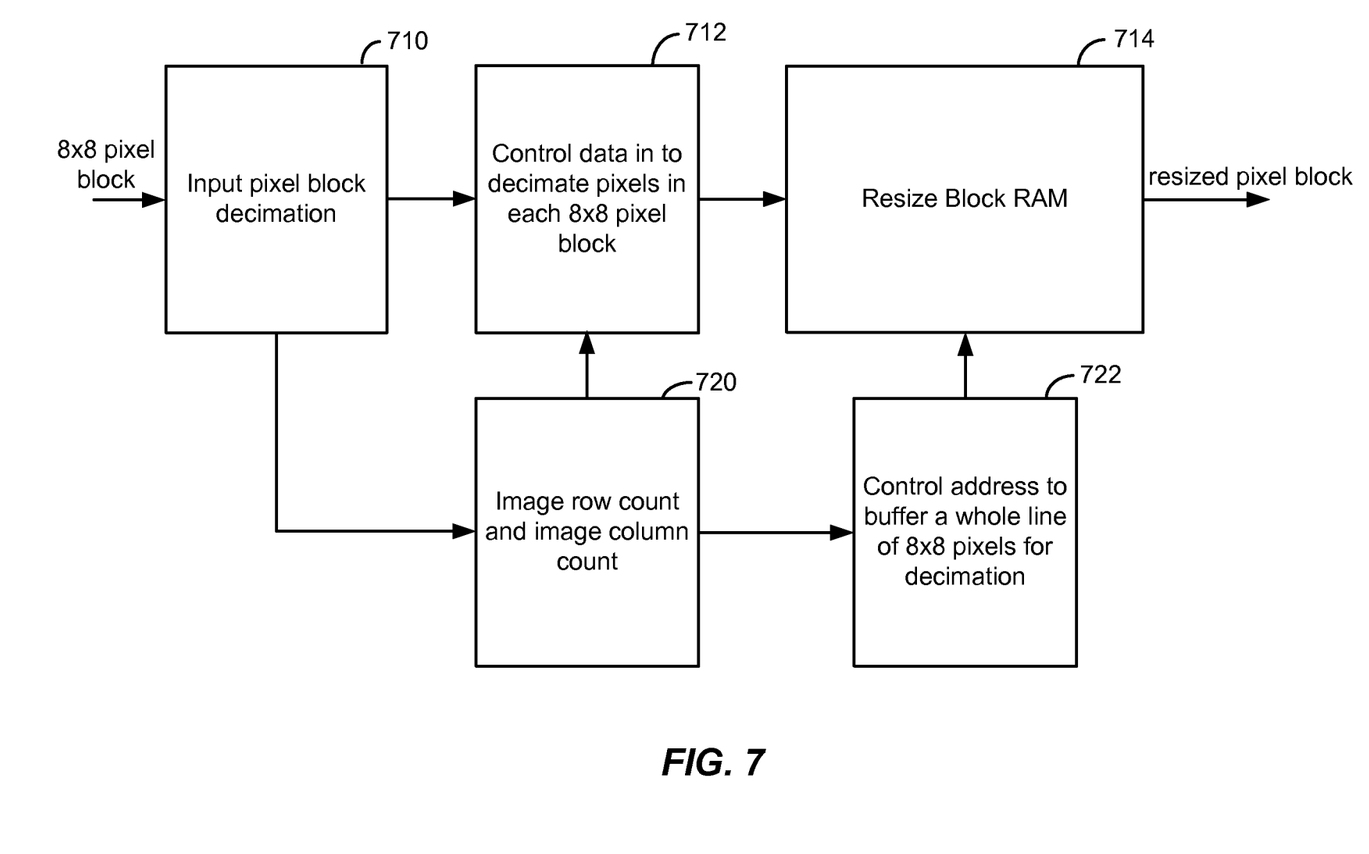
FIG. 7 is a simplified schematic diagram illustrating a system for resizing a pixel block according to an embodiment of the present invention.

FIG. 3 is a simplified schematic diagram illustrating multiple rescaling kernels according to an embodiment of the present invention. In the schematic diagram illustrated in FIG. 3, several select elements of the engine resizing engine are illustrated. FIG. 3 illustrates how the system processes several images concurrently to increase the system throughput. As an example, the PCIe controller 110 (or network controller 1010 as illustrated in FIG. 10) can transfer multiple JPEG images concurrently to the image resizing engine. In an embodiment, the images are stored in the DDR memory and then retrieved for delivery to the various computing kernels, enabling the various computing kernels to process the images concurrently. Because embodiments of the present invention process a number of JPEG images concurrently, and in some implementations, simultaneously, the memory bandwidth requirements are high. In order to reduce the external memory bandwidth requirement, the resizing engine uses on-chip memory provided on the FPGA so that external memory is not utilized in some implementations as illustrated in FIG. 7.

An FPGA device contains a few hundred to a few thousand on chip reconfigurable memory blocks. Embodiments of the present invention utilize a large number of these memory blocks as buffers to hold intermediate data during rescaling operations. Using multiple memory blocks allows the resizer described herein to operate on multiple pixels concurrently or simultaneously, enabling the resizer to have the same throughput as the decoder.

As illustrated in FIG. 3, the computing kernel 120 (only four computing kernels 120a-120d) are illustrated in FIG. 3 for purposes of clarity), but can include in an input FIFO and an output FIFO, with the JPEG codec implemented in the kernel. These FIFOs can be used to buffer data and provide data control. As an example, the interface clock frequency may be different from the computing kernel frequency. In this example, the input/output FIFOs will be used to buffer the data and compensate for the frequency differences. In addition to these buffers inside the computing kernels, additional buffers, e.g., FIFO 310 can be utilized in accordance with embodiments of the present invention.

Figure 9:
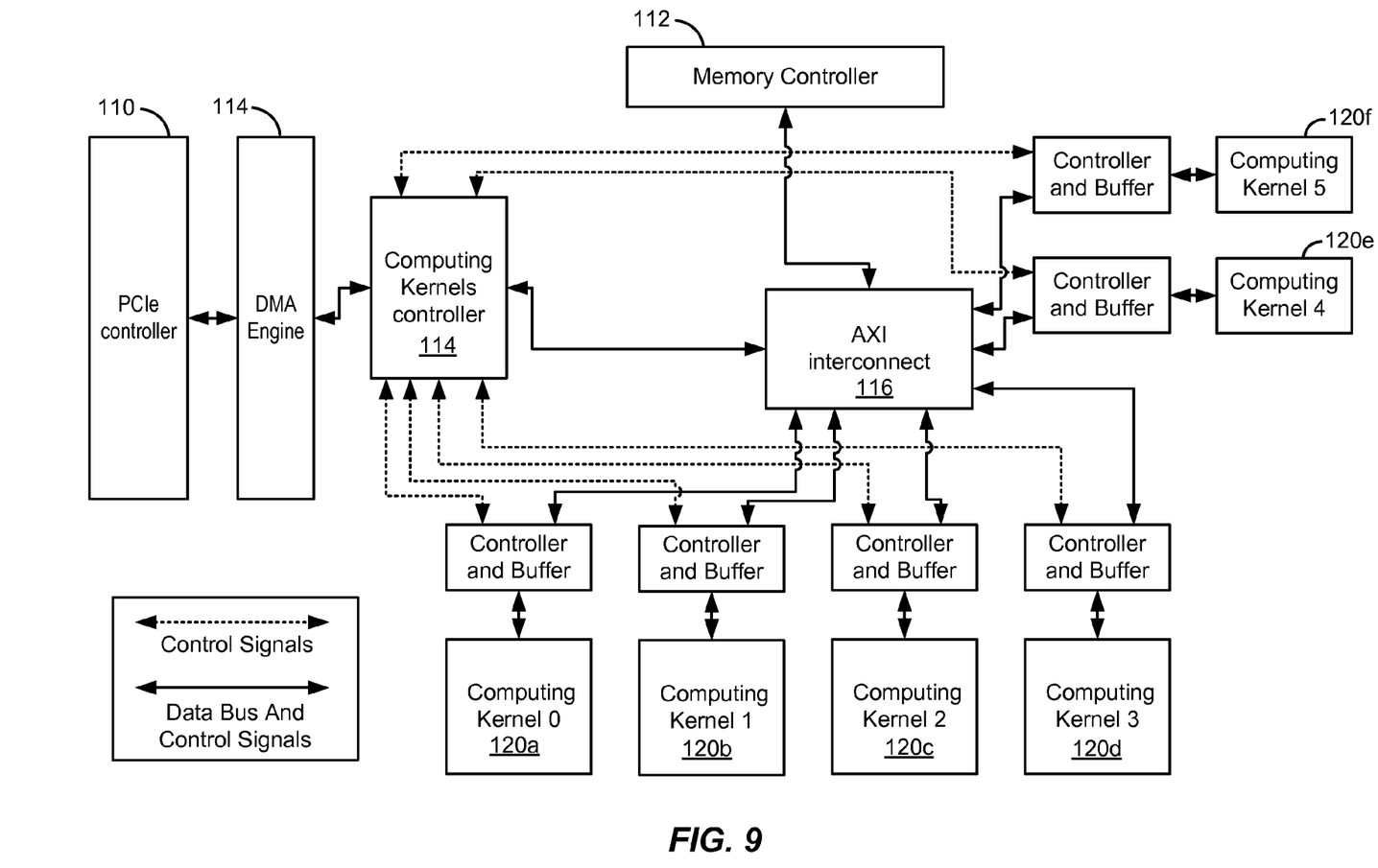
FIG. 9 is a simplified schematic diagram illustrating the flow of control signals and data according to an embodiment of the present invention.

Referring to FIG. 3 and FIG. 9, after resizing of the JPEG image, the kernel writes the result either to the DDR3 memory or directly to the Computing Kernels controller by transmitting the resized image to the AXI Interconnect 116. The Computing Kernel controller will transmit the resized JPEG image to the PC through the DMA controller.

Figure 4:
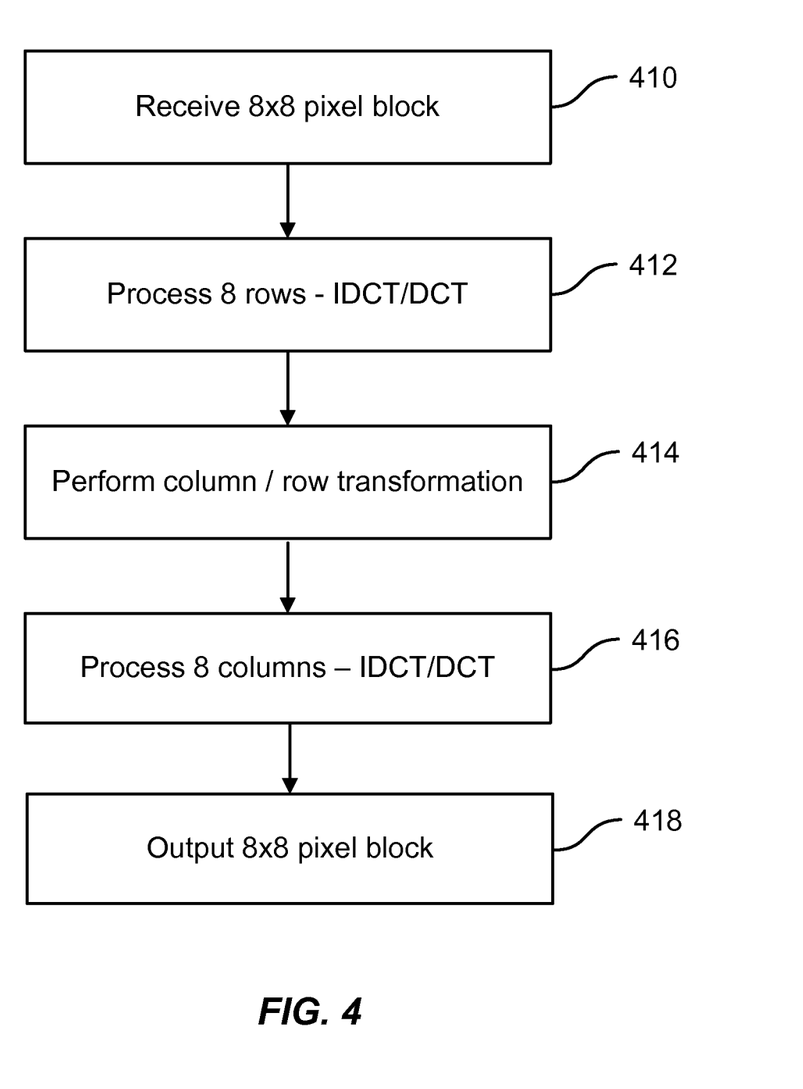
FIG. 4 is a simplified flowchart illustrating a method of performing two-dimensional transformations according to an embodiment of the present invention.

FIG. 4 is a simplified flowchart illustrating a method of performing two-dimensional transformations according to an embodiment of the present invention. Referring to FIG. 4, the method includes receiving a block of pixels (410). The block of pixels in the illustrated embodiment is an 8×8 pixel block, but this is not required by the present invention. In other embodiments, other block sizes can be utilized, including 4×4 and 16×16 pixel blocks.

In each clock cycle, a predetermined number of rows of pixels equal to the block size (e.g., eight pixels) are processed in parallel using either an IDCT or a DCT algorithm depending on whether an IDCT or a DCT (i.e., decoding or encoding) operation is being performed. After the predetermined number of clock cycles (e.g., 8 clock cycles), the entire pixel block will have been processed and the transformed data is available.

A column/row transformation is then performed to prepare the transform pixel block for processing of the columns (414). After effectively turning the pixel block by 90 degrees, the columns are processed in parallel in the next predetermined (e.g. 8) number of clock cycles to perform the IDCT or DCT process (416). Thus, in this embodiment, after 16 clock cycles, the IDCT or DCT process is completed for all 64 pixels and an 8×8 pixel block is output after transformation (418). In some embodiments, the output pixel block is provided in a register that enable output of all 64 pixels in parallel.

It should be appreciated that the specific steps illustrated in FIG. 4 provide a particular method of performing two-dimensional transformations according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5:
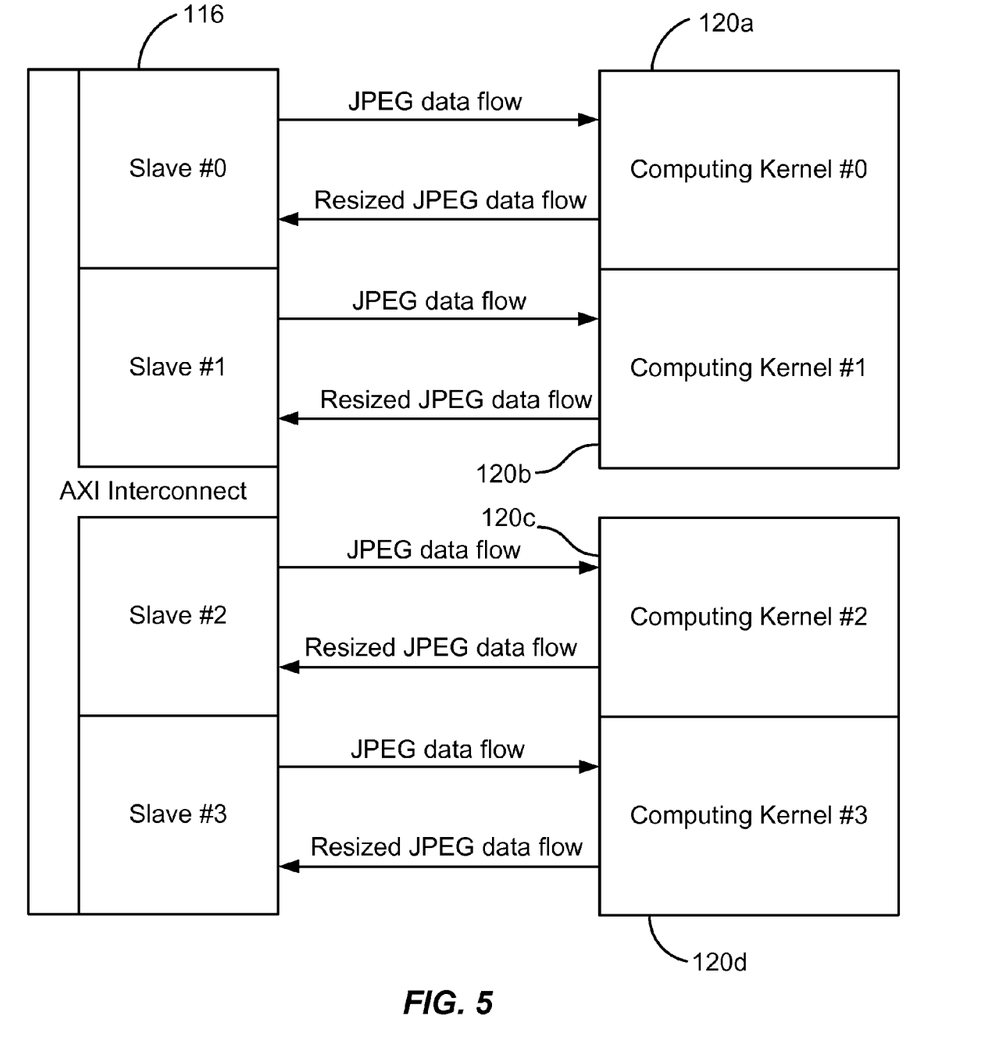
FIG. 5 is a simplified schematic diagram illustrating data flow between rescaling kernels according to an embodiment of the present invention.

FIG. 5 is a simplified schematic diagram illustrating data flow between rescaling kernels according to an embodiment of the present invention. Referring to FIG. 5, details of the interaction between the AXI interconnect 116 and the computing kernels 120a-120d are illustrated. The JPEG data flows from the ports of the AXI Interconnect to the various computing kernels and is then returned as resized JPEG data.

The JPEG data includes a file header, control information, the image payload, and the like. In some embodiments, the file header includes the image size and the size for the resized image. In some embodiments, the resizing information is provided as a ratio of the final image size to the original image size (resolution), but this is not required by the present invention. As an example, the resizing ratio can be provided through the PCIe interface or alternatively, the network interface, depending on which interface is used in the embodiment, and then communicated to the computing kernels, since, in typical embodiments, the resizing requirements are defined prior to delivery of the JPEG data to the image resizing engine.

Table 1 illustrates an exemplary JPEG data packet, including the file header, the Huffman table, the quantization table, the Chroma subsampling, and the like. It should be noted that one or more elements of the JPEG data can be configured in either software, hardware, or combinations thereof. One of ordinary skill in the art would recognize many variations, modifications, and alternatives.

TABLE 1

| Short name | Name | Comments |
| --- | --- | --- |
| SOI | Start Of Image | |
| SOF0 | Start Of Frame (Baseline DCT) | Indicates that this is a baseline DCT-based JPEG, and specifies the width, height, number of components, and component subsampling (e.g., 4:2:0, 4:2:2, 4:4:4) |
| SOF2 | Start Of Frame (Progressive DCT) | Indicates that this is a progressive DCT-based JPEG, and specifies the width, height, number of components, and component subsampling (e.g., 4:2:0, 4:2:2, 4:4:4) |
| DHT | Define Huffman Table(s) | Specifies Huffman tables |
| DQT | Define Quantization Table(s) | Specifies quantization tables |
| SOS | Start Of Scan | Begin left to right, top to bottom scan, followed by entropy encoded data |
| EOI | End Of Image | Mark the end of an JPEG Image |

A JPEG image can use many different Chroma subsampling ratios. However, the only ratios that are in common use are 4:4:4, 4:2:2. Although some embodiments build a JPEG decoder that can support all possible Chroma subsampling ratio, these implementations could introduce significant resource overhead, reducing the number of computing kernels that can be implemented on an FPGA device. Other embodiments use a heterogeneous architecture for which the majority of the computing kernels only support the most common format, and a smaller number of computing kernels support all formats. The number of each type of computing kernel can be dynamically adjusted by loading different bit streams into the FPGA.

A similar strategy is employed with respect to the maximum supported resolution. Typically, supporting resizing of higher resolution images increases the size of the buffer and FIFO that are utilized. As a result, some embodiments utilized a design in which most of the computing kernels only support the most commonly encountered resolution. In one particular embodiment, all but one of the computing kernels support images having a maximum width of 4096 pixels, while one computing kernel supports images having a maximum width of 8192 pixels. One of ordinary skill in the art would recognize many variations, modifications, and alternatives.

As discussed above, although the computing kernels illustrated in FIG. 5 are independent and identical computing kernels, this is not required by the present invention and the computing kernels may have differing capabilities, including processing speed, maximum image resolution, and the like. Accordingly, the scheduling engine can deliver different resolution images to different computing kernels as appropriate to the particular application. Thus, differing images with differing resizing requirements (e.g., degree of compression, turnaround time, or the like) can be sent to differing computing kernels according to embodiments of the present invention. For a FPGA with different capabilities, high processing requirement resizing projects can be delivered to high speed and capability computing kernels and less processing intensive resizing projects (e.g., small images) can be delivered to lower capability computing kernels. In other embodiments, the images are delivered to the computing kernels that are idle in a round robin manner.

Figure 6:
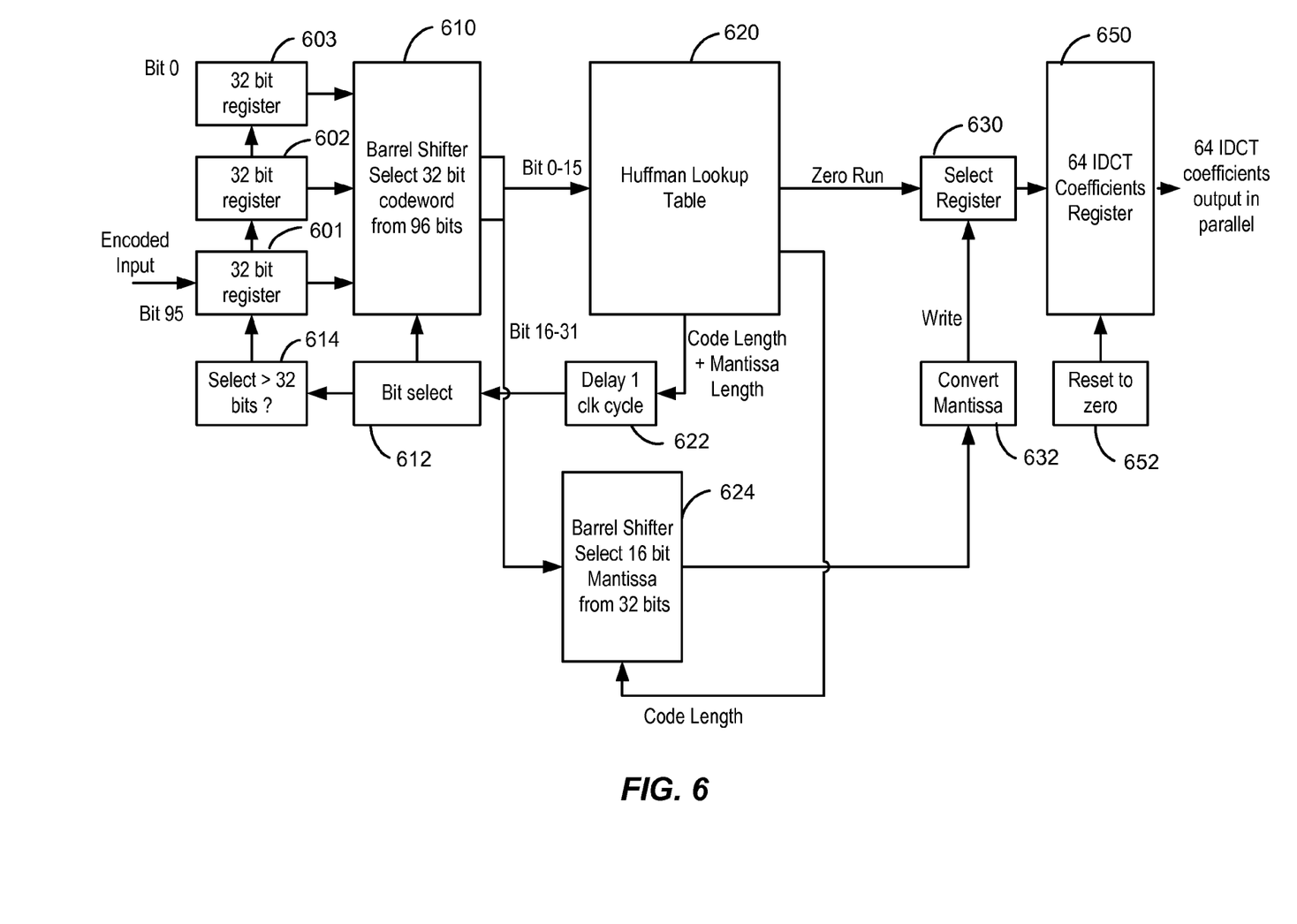
FIG. 6 is a simplified schematic diagram illustrating a system for performing Huffman decoding according to an embodiment of the present invention.

FIG. 6 is a simplified schematic diagram illustrating a system for performing Huffman decoding according to an embodiment of the present invention. In contrast with conventional systems in which one pixel is decoded per clock cycle, embodiments of the present invention decode an entire pixel block (e.g., 64 pixels in an 8×8 pixel block) in a reduced number of clock cycles by using 64 registers.

As described in more detail below, embodiments of the present invention use the leading 16 bits of the input stream (bit 0 to bit 15) as the address and use a look-up table (LUT) to decode one code word every clock cycle. The output of the LUT is fed to a barrel shifter to decode the magnitude in the same clock cycle. The 64 output registers 650 are reset to zero using reset to zero block 652 before decoding each 8×8 block. The reset is done in a way that does not utilize any extra clock cycles. Writing of zero values as specified in the zero run of the Huffman code does not take extra code cycles. This approach enables embodiments of the present invention to decode one code word/magnitude pair every clock cycle. Additionally, embodiments of the present invention use less than 64 clock cycles to decode each 8×8 block since typically, a significant number of the IDCT coefficients are zero. In the best case scenario, where all 64 values of the IDCT coefficients associated with an 8×8 block are zero, it takes only 1 clock cycle to decode the 64 values.

In one implementation, a LUT is utilized that includes $2^{16}$=65,536 entries for each channel. By utilizing the asymmetric nature of a JPEG Huffman tree, other embodiments use two LUTs, each with $2^{16-n}$ entries. In an exemplary embodiment, the value of n=5 is utilized, which corresponds to the size of a single block RAM in some FPGA devices. In other embodiments, other values for n, either larger or smaller can be utilized. For reference, the two lookup tables can be referenced as LUT0 and LUT1.

Figure 8:
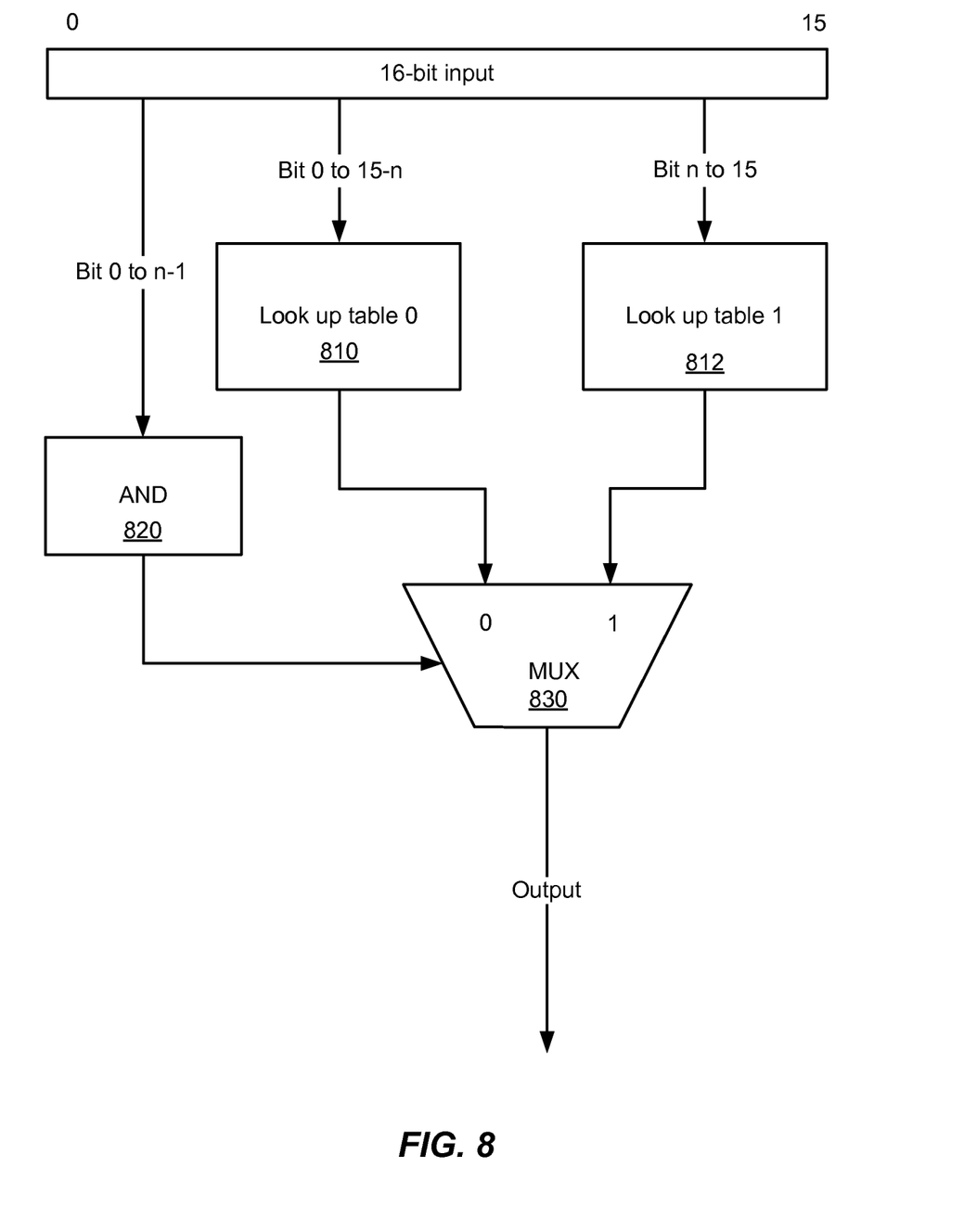
FIG. 8 is a simplified schematic diagram illustrating the use of two lookup tables to decode a JPEG Huffman code according to an embodiment of the present invention.

FIG. 8 is a simplified schematic diagram illustrating the use of two lookup tables to decode a JPEG Huffman code according to an embodiment of the present invention. In the embodiment illustrated in FIG. 8, the two lookup tables are addressed using a bit stream having a length of up to 16 bits and decoding is performed in one clock cycle. As illustrated in FIG. 8, the Huffman Lookup tables 810 and 812 (referred to as LUT0 and LUT1 above) utilized by embodiments utilizes two ROM with 2,048 entries (e.g., $2^{16-n}$ entries where n=5) to replace a ROM with 65,536 entries. In other embodiments, RAM is utilized for the LUTs.

Bits 0 through n−1 of the 16 bits are provided to an AND circuit 820. Bits 0 through 15-n are provided to and used as the address input for LUT 810 and bits n through 15 are provided to and used as the address input for LUT 812. If the first n bits are all one, producing a positive result from the AND circuit 820, then the MUX 830 selects the results of LUT 812 as the output. If not all of the first n bits are one, with some of the first n bits equal to zero, then the AND circuit 820 produces a zero output and the MUX 830 selects the results of LUT 810 as the output. Thus, in some implementations, two small LUTs are utilized by some embodiments, reducing the requirements for block memory on the FPGA significantly.

Huffman encoding is a variable length encoding process, so for each of the code words, it is not known a priori, how many bits are present. Accordingly, the system stores 96 bits of the stream and uses a counter to indicate the starting position for the current Huffman code. As illustrated in FIG. 6, a set of registers are used to perform this function. The Huffman decoder receives an encoded image that is to be decoded (i.e., a compressed file representing the undecoded Huffman stream for processing by the Huffman decoder to produce an decompressed file) and on the first clock cycle, 32 bits are shifted into register 601. On the second clock cycle, the next 32 bits are shifted into register 301 and the original 32 bits are shifted into register 602. Accordingly, after three clock cycles, 96 bits are loaded into registers 601, 602, and 603.

Initially, the output of bit select 612 is zero and the decoder starts the decode process at bit 0. Based on the input from bit select 612, barrel shifter 610 selects bit 0 to bit 31. Out of these 32 bits, bit 0 to bit 15 is provided to the Huffman lookup table 620 as an address for the LUT. Bit 16 to bit 31 is provided to barrel shifter 624, which selects a 16 bit mantissa as described more fully below. The Huffman LUT 620 can be implemented as a ROM with $2^{16}$=65,536 entries. As described above in relation to FIG. 8, multiple LUTs (e.g., two small LUTs) can be utilized in place of the Huffman LUT. Each entry in the Huffman Lookup Table 620 is a 3 tuple {code length, mantissa length, zero run}. The zero run is output to select register 630, which, in conjunction with the convert mantissa block 632, provides an input to the 64 IDCT coefficients decode register 650. Select register 630 can be considered as a multiplexer. The code length is output to barrel shifter 624 that selects the mantissa. The mantissa length is output from barrel shifter 624 to the convert mantissa block 632 that decodes the mantissa. The sum of code length and mantissa length is computed and provided to the delay stage 622 to determine the next Huffman code position.

The sum of the code length and the mantissa length is accumulated in every clock cycle at delay stage 622. When the number of decoded bits is larger than 32, the select >32 bits block, which counts the number of bits that have been decoded, provides an output that causes the values in registers 601, 602, and 603 to be shifted to the next register, flushing out bits 0-31 in register 603. The value of register 603 is overwritten with data from register 602 and new 32 bit values from the Huffman stream are loaded into register 601.

In some implementations, the longest code word for the Huffman code is 16 bits with a mantissa that is 16 bits. In other embodiments, the code word/mantissa pair is up to 32 bits in length. Thus, embodiments of the present invention provide the capability to process 32 bits at a time.

Referring once again to FIG. 6, the output of Huffman LUT 620 provides the length of the current code word (code length), indicating the number of bits that need to be removed to arrive at the beginning of the second code word. Thus, the length of the code word is used in the process of selecting the data that is stored in registers 601, 602, or 603 and delivering this data to the Huffman LUT. If, for example, the code length is 4 bits and the mantissa length is 8 bits, then bit select 612 will provide an output of bit 13, where subsequent processing will begin in the next cycle.

FIG. 7 is a simplified schematic diagram illustrating a system for resizing a pixel block according to an embodiment of the present invention. The operation illustrated in FIG. 7 is performed by the resizer. An 8×8 pixel block is received at the input pixel block decimator 710 along with a control word that indicates the size for the resized pixel block, e.g., 6×6. The Resize Block RAM 714 is used to store the pixel data during the resizing operation. The output of the Resize Block RAM 714 is the resized pixel block. Thus, embodiments of the present invention decimate the pixel block to produce a resized pixel block.

As the pixels come in rectangular blocks of 8×8 pixel, a row counter and column counter is used to produce the coordinate of the 8×8 pixel block in the source image. The module has two parameters that define the column length and row length. During resizing operations, when each 8×8 pixel block is input, the column counter element of counter 720 increases by 8 pixels and when a whole line of input 8×8 pixel blocks are finished, the row counter element of counter 720 increases by 8 pixels. When the column counter and the row counter reach the defined column length and row length, the resizing operation is finished.

The following example is provided for a resize ratio of 50%. The input is an 8×8 pixel block and the output of resize is also an 8×8 pixel block, which is decimated from 4 input 8×8 pixel blocks. A line of input 8×8 pixel blocks are buffered to use the first input of a whole line of 8×8 pixel blocks to form the upper 4×8 pixel blocks and then to buffer these pixels and wait until the second line of input 8×8 pixel blocks is received and decimated to product the lower 4×8 pixel blocks, which are then used to form the whole 8×8 output pixel block. This buffering operation is performed by the control element 712 in FIG. 7.

Embodiments of the present invention perform resizing using no external memory since the Resize Block RAM 714 is provided in the image resizing engine. Because external memory is not utilized in some embodiments, the speed at which resizing is performed can be increased in comparison to conventional techniques utilizing external memory.

Slices of the resized image are assembled resized pixel block by resized pixel block in the block RAM 714, which in an embodiment, is 4,096 pixels by 16 pixels. The slices of the resized image are then encoded into JPEG format and written into the DDR memory for eventual assembly of the entire resized image.

FIG. 9 is a simplified schematic diagram showing the flow of control signals and data according to an embodiment of the present invention. FIG. 9 provides additional illustration of the control signal and data flow for the system illustrated in FIG. 1. Referring to FIG. 9, the computing kernels controller dispatch an image resizing request to a slave controller after an image is received from the PC and written to DDR memory. The slave controller will then fetch the JPEG image from DDR memory and dispatch the image to the computing kernel. The slave controller queues the job request send by the computing Kernels controller so new images can be dispatched to a slave controller before previous jobs are finished.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of resizing image files, the method comprising:
   providing an AXI interconnect;
   providing a plurality of computing kernels communicatively coupled to the AXI interconnect;
   receiving a first image file characterized by a first image resolution;
   sending, from a first port of the AXI Interconnect to a first computing kernel, a first payload associated with the first image file;
   receiving a second image file characterized by a second image resolution;
   sending, from a second port of the AXI Interconnect to a second computing kernel, a second payload associated with the second image file;
   resizing, at the first computing kernel and the second computing kernel, the first payload and the second payload concurrently, wherein the first payload is resized to a third image resolution differing from the first image resolution and the second payload is resized to a fourth image resolution differing from the second image resolution;
   sending, from the first computing kernel to the first port of the AXI Interconnect, the resized first payload; and
   sending, from the second computing kernel to the second port of the AXI Interconnect, the resized second payload.

2. The method of claim 1 further comprising:
   providing as an output a third resized image file including the resized first payload; and
   providing as another output a fourth resized image file including the resized second payload.

3. The method of claim 1 further comprising:
   sending header information associated with the first image file to the first computing kernel in association with sending the first payload; and
   sending header information associated with the second image file to the second computing kernel in association with sending the second payload.

4. The method of claim 1 wherein the first image file and the second image file are formatted according to a JPEG standard.

5. The method of claim 1 wherein the first image file and the second image file comprise associated payload data compressed according to an image compression standard.

6. The method of claim 1 wherein the third image resolution is less than the first image resolution and the fourth image resolution is less than the second image resolution.

7. A non-transitory computer-readable storage medium comprising a plurality of computer-readable instructions tangibly embodied on the computer-readable storage medium, which, when executed by a data processor, provide resized image files, the plurality of instructions comprising:
   instructions that cause the data processor to receive a first image file characterized by a first image resolution;
   instructions that cause the data processor to send, from a first port of an AXI Interconnect to a first computing kernel, a first payload associated with the first image file;
   instructions that cause the data processor to receiving a second image file characterized by a second image resolution;

instructions that cause the data processor to send, from a second port of the AXI Interconnect to a second computing kernel, a second payload associated with the second image file;

instructions that cause the data processor to resize, at the first computing kernel and the second computing kernel, the first payload and the second payload concurrently, wherein the first payload is resized to a third image resolution differing from the first image resolution and the second payload is resized to a fourth image resolution differing from the second image resolution;

instructions that cause the data processor to send, from the first computing kernel to the first port of the AXI Interconnect, the resized first payload; and instructions that cause the data processor to send, from the second computing kernel to the second port of the AXI Interconnect, the resized second payload.

8. The non-transitory computer-readable storage medium of claim 7 further comprising:

instructions that cause the data processor to provide as an output a third resized image file including the resized first payload; and instructions that cause the data processor to provide as another output a fourth resized image file including the resized second payload.

9. The non-transitory computer-readable storage medium of claim 7 further comprising:

instructions that cause the data processor to send header information associated with the first image file to the first computing kernel in association with sending the first payload; and instructions that cause the data processor to send header information associated with the second image file to the second computing kernel in association with sending the second payload.

10. The non-transitory computer-readable storage medium of claim 7 wherein the first image file and the second image file are formatted according to a JPEG standard.

11. The non-transitory computer-readable storage medium of claim 7 wherein the first image file and the second image file comprise associated payload data compressed according to an image compression standard.

12. The non-transitory computer-readable storage medium of claim 7 wherein the third image resolution is less than the first image resolution and the fourth image resolution is less than the second image resolution.

* * * * *